(12) United States Patent
Darrow

(10) Patent No.: US 8,197,149 B2
(45) Date of Patent: Jun. 12, 2012

(54) APPARATUSES AND SYSTEMS FOR SUPPORTING AND POSITIONING CAMERAS AND OTHER EQUIPMENT

(75) Inventor: Richard Darrow, Denville, NJ (US)

(73) Assignee: Tocad America, Inc., Rockaway, NJ (US)

( * ) Notice: Subject to any disclaimer, the term of this patent is extended or adjusted under 35 U.S.C. 154(b) by 540 days.

(21) Appl. No.: 11/741,545

(22) Filed: Apr. 27, 2007

(65) Prior Publication Data

US 2008/0267613 A1 Oct. 30, 2008

(51) Int. Cl.
*F16M 11/40* (2006.01)
*G03B 17/56* (2006.01)

(52) U.S. Cl. ........................ 396/428; 248/168

(58) Field of Classification Search .................. 396/419, 396/420, 428, FOR. 913; 248/163.1, 168, 248/173, 121
See application file for complete search history.

(56) References Cited

U.S. PATENT DOCUMENTS

| 2,684,822 A * | 7/1954 | Odin .......................... 248/179.1 |
| 2,824,503 A | 2/1958 | Weiss |
| 3,006,052 A | 10/1961 | Stickney et al. |
| 3,306,634 A | 2/1967 | Groves |
| 3,329,967 A | 7/1967 | Martinez |
| 3,356,325 A | 12/1967 | Schnase |
| 3,511,981 A | 5/1970 | Haraden et al. |
| 3,603,781 A | 9/1971 | Kobayashi et al. |
| 3,612,462 A | 10/1971 | Mooney et al. |
| 3,728,536 A | 4/1973 | Baker |
| D236,492 S | 8/1975 | Helgesson |
| 4,057,816 A | 11/1977 | Killian, Jr. et al. |
| 4,302,954 A | 12/1981 | Zisterer et al. |
| 4,397,145 A | 8/1983 | Reist |
| 4,570,887 A | 2/1986 | Banister |
| 4,739,801 A | 4/1988 | Kimura et al. |
| D305,717 S | 1/1990 | Soren et al. |
| 4,922,383 A | 5/1990 | Aoyama et al. |
| 4,979,709 A | 12/1990 | Ishikawa |

(Continued)

FOREIGN PATENT DOCUMENTS

CN 200972043 11/2007

(Continued)

OTHER PUBLICATIONS

Johnson, Steve, "Goose Leg Tripod". Strange New Products weblog. Entry dated Nov. 4, 2005, verified by Internet Archive <URL: http://www.archive.org/index.php> to be dated to at least Feb. 22, 2006. Retrieved from the Internet <URL: http://www.strangenewproducts.com/2005/11/goose-leg-tripod.html>.*

(Continued)

*Primary Examiner* — Clayton E LaBalle
*Assistant Examiner* — Leon W Rhodes, Jr.
(74) *Attorney, Agent, or Firm* — Perkins Coie LLP

(57) ABSTRACT

Apparatuses and systems for supporting and positioning cameras and other equipment are disclosed herein. An apparatus for supporting a camera can include one or more bendable support members extending from a camera holding portion. Each of the bendable support members can include a plurality of shaped outer portions arranged on an elongate, bendable core. The bendable core can include a plastically deformable material that retains its shape after being bent with little or no spring-back, and each of the shaped outer portions can include spherical portions formed from a resilient, elastomeric material.

20 Claims, 6 Drawing Sheets

U.S. PATENT DOCUMENTS

| | | | |
|---|---|---|---|
| 5,043,750 A * | 8/1991 | Yamaguchi | 396/428 |
| 5,119,203 A | 6/1992 | Hosaka et al. | |
| D329,040 S | 9/1992 | Seki et al. | |
| 5,242,767 A | 9/1993 | Roback et al. | |
| 5,276,596 A | 1/1994 | Krenzel | |
| 5,314,763 A | 5/1994 | Aksoy et al. | |
| 5,332,136 A | 7/1994 | Rudolph | |
| D350,328 S | 9/1994 | Alexandres et al. | |
| D352,269 S | 11/1994 | Alexandres et al. | |
| 5,449,206 A | 9/1995 | Lockwood | |
| 5,535,437 A | 7/1996 | Karl et al. | |
| 5,620,352 A | 4/1997 | Tzong et al. | |
| D379,962 S | 6/1997 | Nuovo et al. | |
| 5,660,945 A | 8/1997 | McCormick et al. | |
| D384,327 S | 9/1997 | Nakui et al. | |
| 5,740,586 A | 4/1998 | Gomas et al. | |
| D395,278 S | 6/1998 | Nakui et al. | |
| 5,765,938 A | 6/1998 | Rousso et al. | |
| 5,785,286 A | 7/1998 | Hiesinger et al. | |
| 5,851,036 A | 12/1998 | Vanesky | |
| 5,857,241 A | 1/1999 | Camp, Jr. et al. | |
| 5,997,047 A | 12/1999 | Pimentel et al. | |
| 6,254,044 B1 | 7/2001 | Lee et al. | |
| 6,408,524 B1 | 6/2002 | Lai et al. | |
| 6,626,210 B2 | 9/2003 | Luettgen et al. | |
| 6,648,376 B2 | 11/2003 | Christianson | |
| 6,749,166 B2 | 6/2004 | Valentine et al. | |
| RE38,897 E | 11/2005 | Krenzel | |
| 7,021,593 B1 | 4/2006 | Fan et al. | |
| 7,178,767 B2 | 2/2007 | Steyn et al. | |
| 7,186,007 B1 | 3/2007 | Rotwitt | |
| 2004/0211868 A1 | 10/2004 | Holmes et al. | |
| 2004/0228080 A1 | 11/2004 | Hillman et al. | |
| 2005/0082824 A1 | 4/2005 | Luettgen et al. | |
| 2005/0205730 A1* | 9/2005 | Carnevali | 248/163.1 |
| 2006/0175482 A1 | 8/2006 | Johnson | |
| 2006/0285844 A1 | 12/2006 | Hershenzon | |
| 2007/0154254 A1 | 7/2007 | Bevirt | |
| 2007/0212163 A1 | 9/2007 | Bevirt | |
| 2008/0035807 A1 | 2/2008 | Bevirt et al. | |
| 2008/0069630 A1 | 3/2008 | Bevirt | |

FOREIGN PATENT DOCUMENTS

| | | | |
|---|---|---|---|
| DE | 854100 | | 10/1952 |
| DE | 3011798 | * | 3/1980 |
| DE | 10235999 | | 3/2004 |
| FR | 1098836 | | 8/1955 |
| FR | 2596492 | | 10/1987 |
| JP | 05145816 | | 6/1993 |
| JP | 2000056391 | | 2/2000 |
| JP | 2004317578 | | 11/2004 |
| JP | 2005260522 | | 9/2005 |
| JP | 200786706 A | * | 4/2007 |

OTHER PUBLICATIONS

JoeBen Bevirt, Declaration filed in U.S. Publication No. 2007/0154254, Nov. 21, 2006, 1 page.

JoeBen Bevirt, "The GorillaPod," Spring 1996 Brochure, 2 pgs. [accessed from Internet on Nov. 20, 2006].

Joby.com, http://web.archive.org/web/2070515131114/www.joby.com, 11 pgs. [accessed from Internet archives on Apr. 30, 2007].

Joby.com, "The Original Go-Anywhere, Do-Everything Tripod Your Compact Digital Camera Won't Want to Live Without," http://www.joby.com/products/gorillapod/original/, 3 pgs. [accessed from Internet on Jun. 18, 2008].

International Search Report and Written Opinion; International Patent Application No. PCT/US07/67804; Filed: Apr. 30, 2007; Applicant: Tocad America, Inc.; Mailed on Sep. 17, 2008.

International Search Report and Written Opinion; International Patent Application No. PCT/US08/61644; Filed: Apr. 25, 2008; Applicant: Tocad America, Inc.; Mailed on Aug. 8, 2008.

International Search Report and Written Opinion; International Patent Application No. PCT/US08/80353; Filed: Oct. 17, 2008; Applicant: Tocad America, Inc.; Mailed on Dec. 16, 2008.

Joby Press, Reprint of Time Magazine article entitled "Notecard: Postcard from Las Gizmos, Nev." Jan. 22, 2007, Illustration and col. 3, in 1-9 [Retrieved on Aug. 5, 2008]. Retrieved from the Internet <http://www.joby.com/press/timemag/>.

* cited by examiner

APPARATUSES AND SYSTEMS FOR SUPPORTING AND POSITIONING CAMERAS AND OTHER EQUIPMENT

TECHNICAL FIELD

The following disclosure relates generally to tripods and other portable apparatuses for supporting cameras and other equipment in desired positions and orientations.

BACKGROUND

There are a number of advantages to using a tripod when taking pictures. For example, a tripod can hold a camera almost perfectly still to enhance picture clarity. Tripods can also support lenses that are too large or unwieldy to be held steadily by hand. In addition, tripods can allow the photographer to get into the picture when used with a timer. Another advantage is that most high quality tripods include interchangeable heads that the photographer to attach a variety of devices, including compact digital cameras, camcorders, DVD recorders, etc.

One shortcoming of conventional tripods, however, is that they typically require a substantially level and stable support surface. As a result, it is often difficult to use conventional tripods on irregular terrain, moving vehicles, etc.

The Joby Gorillapod™, provided by the Joby Corporation of 1535 Mission Street, San Francisco, Calif. 94103, was designed to overcome the shortcomings of conventional tripods. The Gorillapod™ has one to three legs which can be bent and rotated as needed to accommodate an inclined surface or attach to an upstanding structure.

FIG. 1A is a cross-sectional view of a portion of a tripod leg 100. The tripod leg 100 is similar to that found on the Gorillapod™, and is composed of a series of interconnecting members 102 (identified individually as interconnecting members 102a-c). Each of the interconnecting members 102 includes a male ball portion 104 and a female socket portion 106. As shown in FIG. 1A, each ball portion 104 is rotatably received in an adjacent socket portion 106. The ball/socket arrangement allows the tripod leg 100 to flex, and the friction between the interlocking balls and sockets holds the leg 100 in a desired position after forming.

One shortcoming of the prior art tripod leg illustrated in FIG. 1A is that if the leg 100 is over-flexed, the ball portions 104 can pull out of the mating socket portions 106, as shown in FIG. 1B. Accordingly, it would be advantageous to have a camera tripod that could be bent to accommodate irregular mounting surfaces without breaking if overflexed.

DETAILED DESCRIPTION

The following disclosure describes various embodiments of apparatuses and systems for supporting and positioning cameras and other equipment in desired locations and/or orientations. In one embodiment, for example, an apparatus for supporting a camera includes an adjustable camera holding portion and a plurality of formable legs. In this embodiment, each of the formable legs includes a first end portion operably coupled to the camera holding portion, and a second end portion spaced apart from the camera holding portion. Each of the formable legs further includes an elongate bendable member extending between the first and second end portions, and a plurality of spherical portions consecutively arranged on the elongated bendable member in the space between the first and second end portions. As described in greater detail below, in one embodiment, the elongate bendable member can include a plastically deformable material and each of the spherical portions can include an elastomeric material.

Certain details are set forth in the following description and in FIGS. 2-6 to provide a thorough understanding of various embodiments so the invention. Other details describing well-known structures and systems often associated with camera tripods and other equipment mounting apparatuses, however, are not set forth in the following disclosure to avoid unnecessarily obscuring the description of the various embodiments of the invention.

Many of the details, dimensions, and other features shown in the Figures are merely illustrative of particular embodiments of the invention. Accordingly, other embodiments can have other details, dimensions, and features without departing from the spirit or scope of the present invention. In addition, further embodiments of the invention can be practiced without several of the details described below.

In the Figures, identical reference numbers identify identical, or at least generally similar, elements. To facilitate the discussion of any particular element, the most significant digit or digits of any reference number refer to the Figure in which that element is first introduced. For example, element 210 is first introduced and discussed with reference to FIG. 2.

Figure 1B:
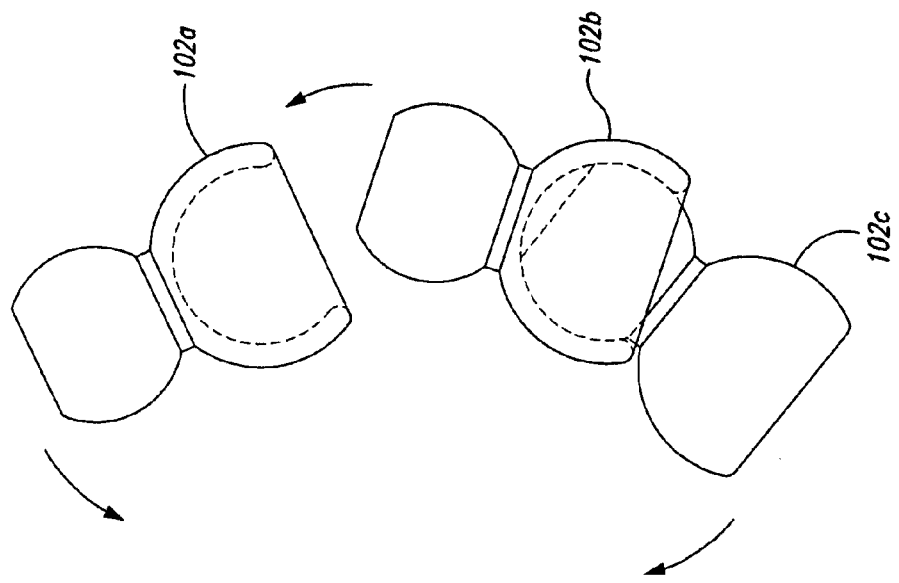
FIG. 1B is an exploded view of the tripod leg of FIG. 1A.
Figure 1A:
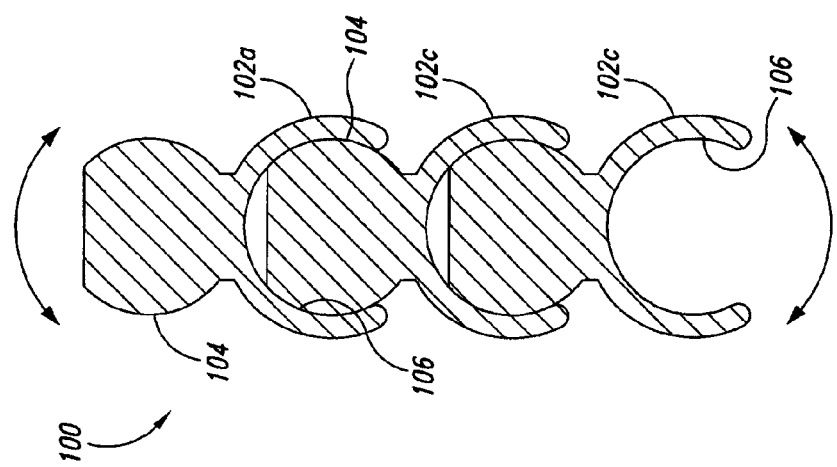
FIG. 1A is a cross-sectional view of a portion of a tripod leg configured in accordance with the prior art.
Figure 2:
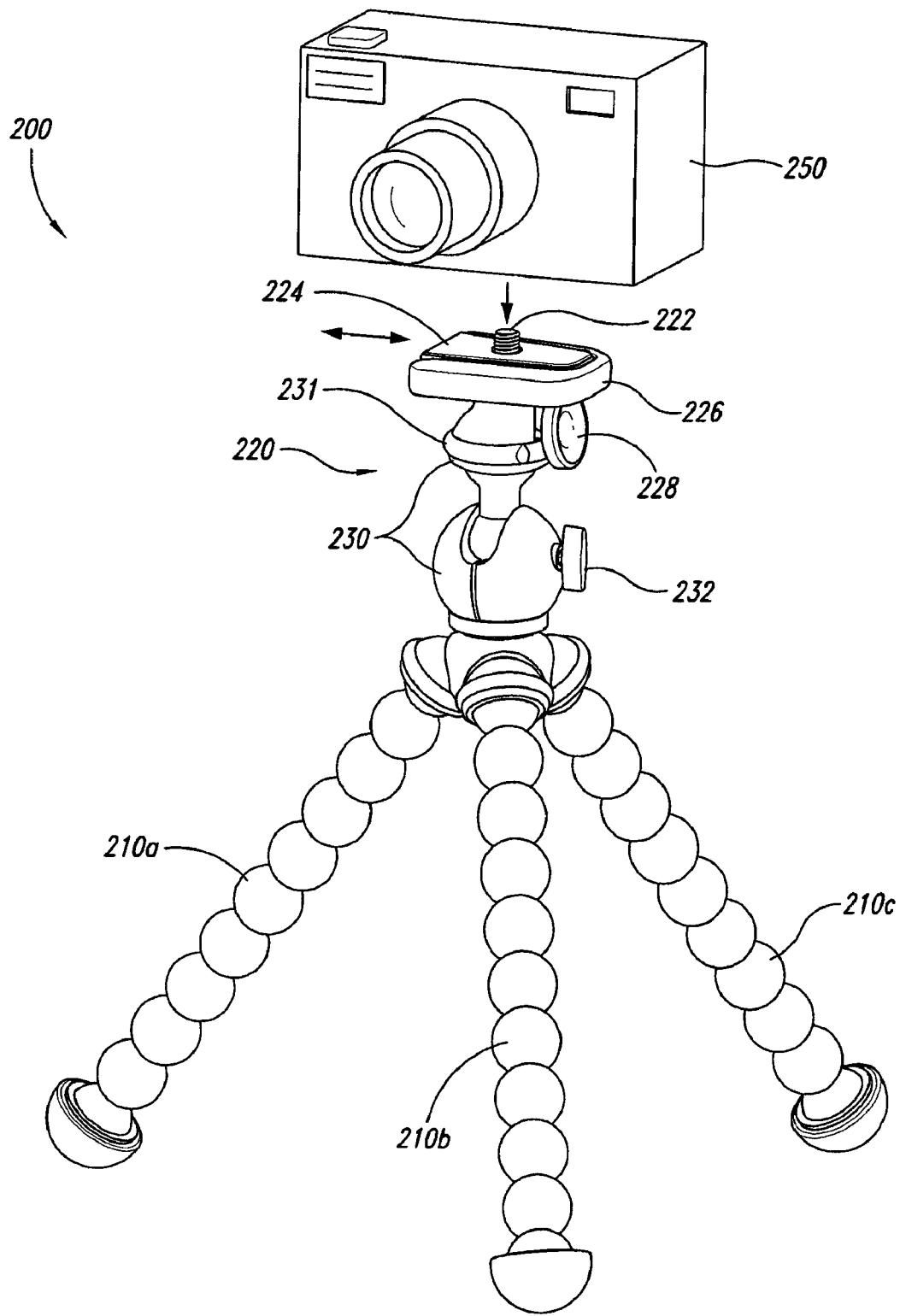
FIG. 2 is an isometric view of an adjustable camera support configured in accordance with an embodiment of the invention.

FIG. 2 is an isometric view of an adjustable camera support apparatus 200 ("support apparatus 200") configured in accordance with an embodiment of the invention. In one aspect of this embodiment, the apparatus 200 includes a plurality of formable support members or legs 210 (identified individually as a first leg 210a, a second leg 210b, and a third leg 210c) which are pivotally connected to an equipment or camera holding portion 220. The camera holding portion 220 can include an adjustable mounting head 226. The mounting head 226 includes a removable clip 224 which carries a camera engagement feature, such as a threaded stud 122, for releasably engaging a camera 250. The user can disengage the camera 250 from the support apparatus 200 by depressing a button 228 to release the clip 224 from the mounting head 226. The camera holding portion 220 of the illustrated embodiment can further include one or more adjustable joints 230. The joints 230 can accommodate virtually any orientation of the camera 250, and can be releasably locked into a particular position by a first clamping feature 231 (e.g., a rotatable lock-ring) and/or a second clamping feature 232 (e.g., a pinch-bolt).

Figure 3:
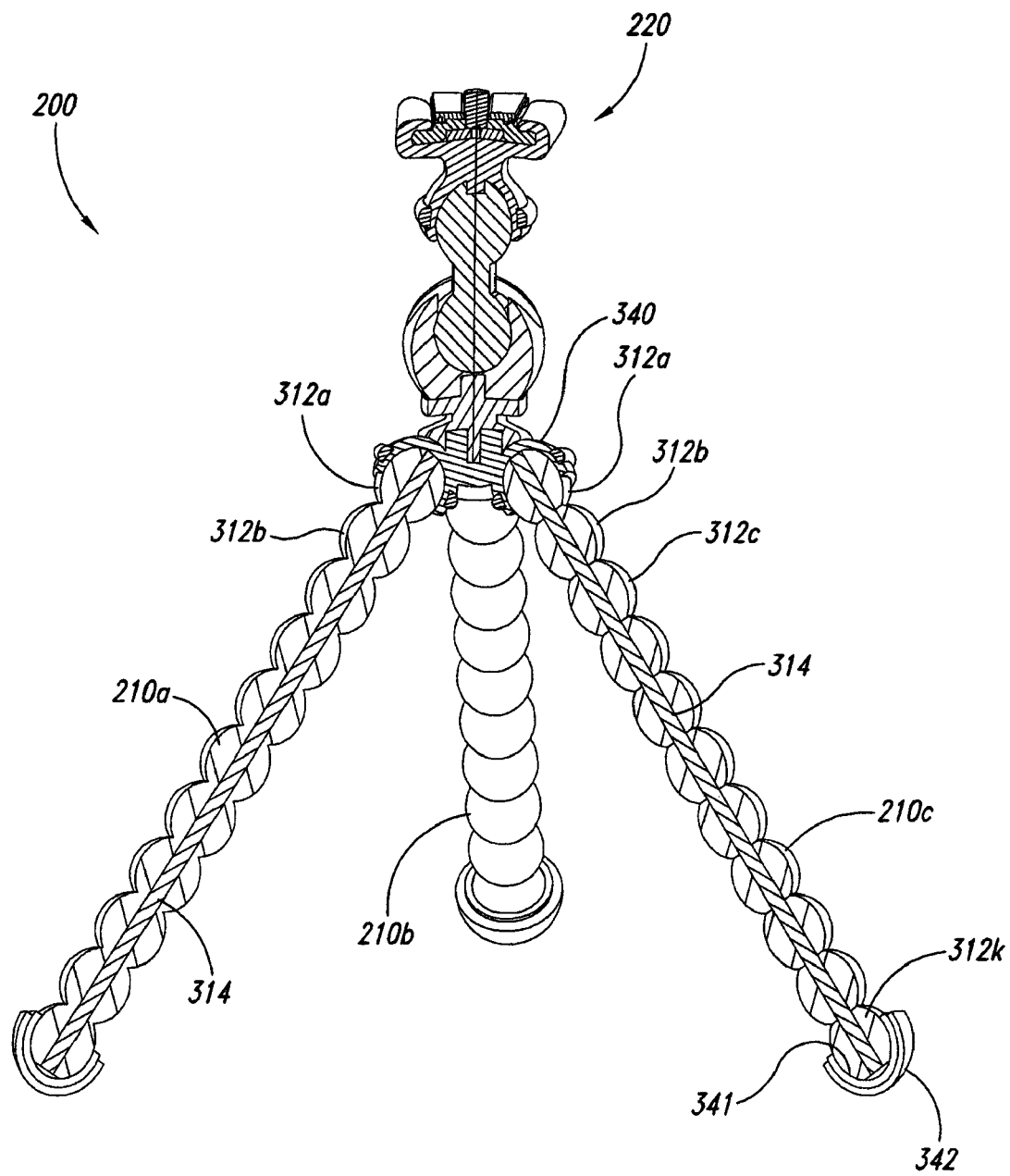
FIG. 3 is a partial cross-sectional view of the adjustable camera support of FIG. 2.

FIG. 3 is a partial cross-sectional view of the camera support apparatus 200 of FIG. 2. As this view illustrates, each of the legs 210 includes a plurality of shaped outer portions 312 (identified individually as shaped outer portions 312a-k) arranged on an elongate, bendable member or core 314. The core 314 can include a plastically deformable material that can be formed or bent into a given shape and remain in that shape without appreciable spring-back. Such materials can include, for example, various types of metals such as aluminum (e.g., 1070 aluminum), copper, steel and other known metals of suitable composition, ductility, heat treat, etc. In other embodiments, the core 314 can be made from other known metal and non-metal materials that can be formed or bent into a given shape and remain in that shape without appreciable spring-back.

In the illustrated embodiment, each of the shaped outer portions 312 has a generally spherical shape and can be made from a suitably compressible and resilient material. For example, in one embodiment, the shaped outer portions 312 can be made from a thermoplastic elastomer ("TPE"). In other embodiments, the shaped outer portions 312 can have other shapes (e.g., ellipsoids, ovaloids, etc.), and can be made from other suitable materials. Such materials can include, for example, other elastomeric materials, such as rubber, some foams, etc., and/or other non-elastomeric materials such as some plastics, wood, etc. In one embodiment, the plurality of shaped outer portions 312 can be integrally formed (e.g., molded) and interconnected, as illustrated by the first leg 210a. In another embodiment, the shaped outer portions 312 can be separately formed as individual pieces and then assembled on the core 314, as illustrated by the third leg 210c.

In the illustrated embodiment, the shaped outer portions 312 are contiguously arranged on the core 314, and each of the shaped outer portions 312 includes an outer surface (e.g. a convex outer surface) that contacts the adjacent outer surface(s) of the adjacent outer portion(s) 312. In other embodiments, however, various types of spacers (not shown) can be positioned between one or more of the shaped outer portions 312 if desired for cost, functional, or other considerations.

In another aspect of this embodiment, the first shaped outer portion 312a is pivotally received in a socket 340 to operably couple the leg 210 to the camera holding portion 220. The last shaped outer portion 312k can be at least partially covered by a cap 341, which in turn can be covered by a non-slip boot 342. The cap 341 can be made from a plastic, such as acrylonitrile butadiene styrene ("ABS"), and the boot 342 can be made from TPE, rubber, or another suitable material.

The bendable core 314 has relatively little or no memory, such that when it is bent into a particular shape it tends to remain in that shape. As a result, the legs 210 can easily be bent or formed into a desired shape to position the camera 250 on irregular terrain, or to attach the camera 250 to a particular object or structure (e.g., a tree limb, a person's body, a vehicle, etc.). Although each of the shaped outer portions 312 is angularly movable relative to the other shaped outer portions, the adjacent shaped outer portions 312 bear against each other at extreme angles to keep the core 114 from being over-bent or kinked. The shaped outer portions 312 can provide a comfortable gripping surface for the user to grasp when bending the leg 210. In addition, the elastomeric and/or compressible properties of the shaped outer portions 312 of the illustrated embodiment can help the apparatus 200 hold on to a structure when wrapped around the structure.

In contrast to conventional tripods having bendable legs, the elongate core 314 of the present invention prevents the leg 210 from coming apart when bent to extreme angles. A further advantage of this embodiment is that shaped outer portions 312 prevent the user from inadvertently over-bending the leg 210 during use.

Figure 4:
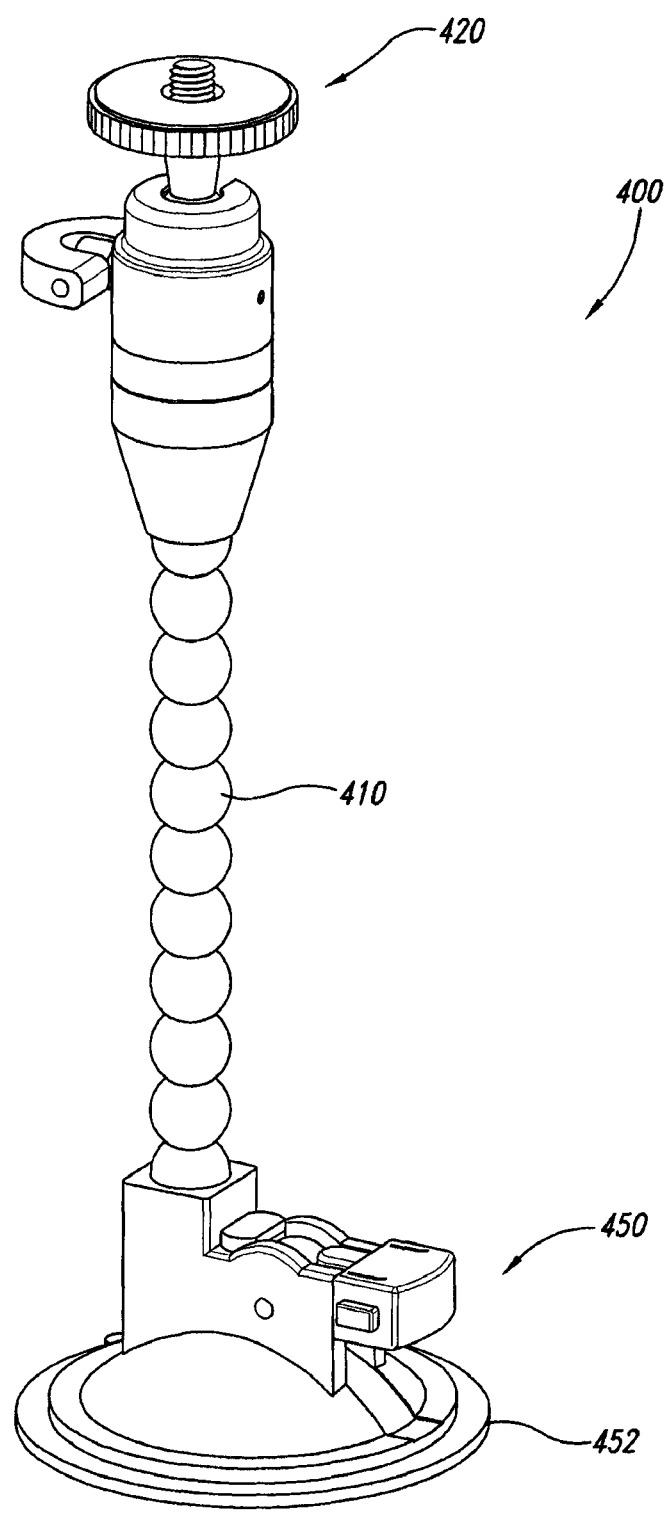
FIG. 4 is an isometric view of an adjustable camera support configured in accordance with another embodiment of the invention.

FIG. 4 is an isometric view of a camera support apparatus 400 ("support apparatus 400") configured in accordance with another embodiment of the invention. Many features of the support apparatus 400 can be at least generally similar in structure and function to the corresponding features of the support apparatus 200 described above with reference to FIGS. 2 and 3. In this particular embodiment, however, the support apparatus 400 includes a camera holding portion 420 supported by a single formable support member or leg 410 in a "monopod" configuration. As described in greater detail below with reference to FIG. 5, the leg 410 extends from a base 450 that includes an attachment feature 452 for releasably attaching the support apparatus 400 to a mounting surface (not shown).

Figure 5:
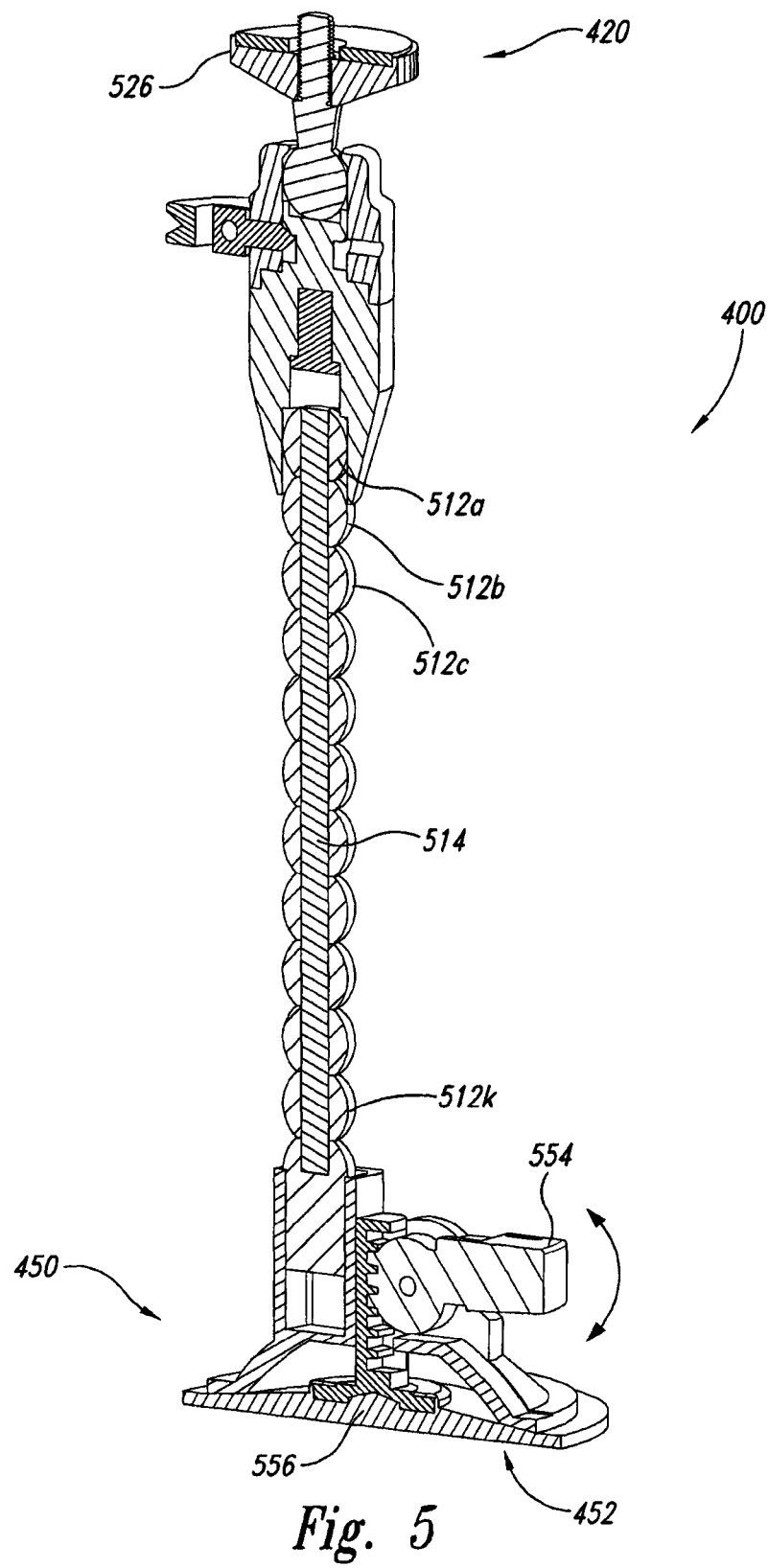
FIG. 5 is a cross-sectional view of the adjustable camera support of FIG. 4.

FIG. 5 is a cross-sectional isometric view of the support apparatus 400 of FIG. 4. As this view illustrates, the support leg 410 can be at least generally similar in structure and function to the support legs 210 described above with reference to FIGS. 2 and 3. More specifically, the support leg 410 can include a plurality of shaped outer portions 512 (identified individually as shaped outer portions 512a-k), which are arranged on an elongate, bendable member or core 514. The shaped outer portions 512 and the core 514 can be at least generally similar in structure and function to the shaped outer portions 312 and the core 314, respectively, described above.

In the illustrated embodiment, the base attachment feature 452 includes a suction cup 556 that is operably coupled to an actuator or ratchet 544. The ratchet 544 can be moved in a first direction to attach the suction cup 556 to a suitable surface for use of the apparatus 400. The ratchet 544 can be moved in a second direction to release the suction cup 556 from the surface. In other embodiments, the base 450 can include other means, e.g., magnets, adhesives, etc. for releasably attaching the support apparatus 400 to a desired surface.

In the illustrated embodiment, the camera holding portion 420 includes an adjustable mounting head 526 that can tilt in virtually any direction. In other embodiments, however, the support apparatus 400 can include other types of mounting heads known in the art.

Figure 6:
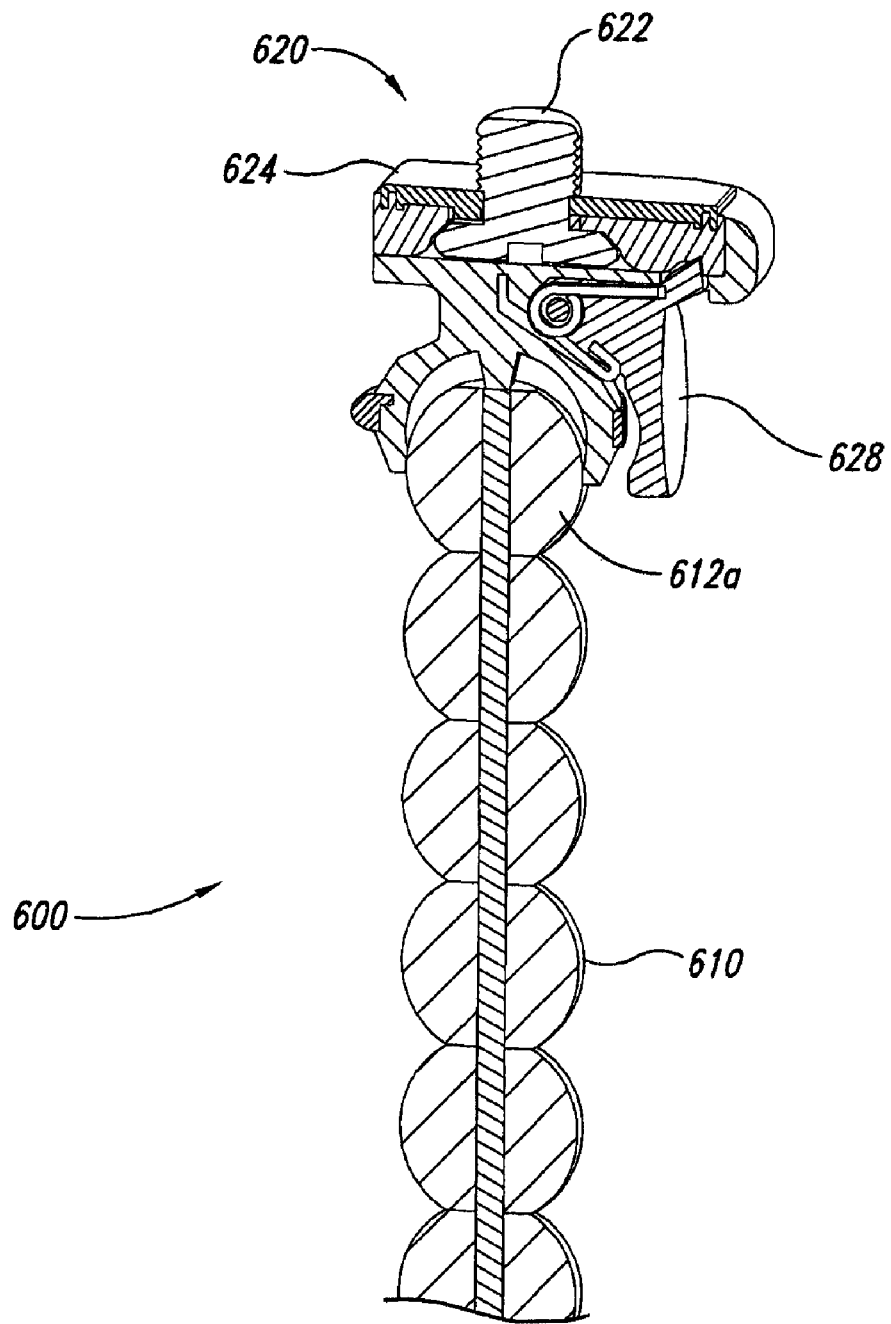
FIG. 6 is a cross-sectional view of a camera holding portion usable with an adjustable camera support configured in accordance with an embodiment of the invention.

FIG. 6 is a cross-sectional view of a camera holding portion 620 of a camera support apparatus 600 ("support apparatus 600") configured in accordance with another embodiment of the invention. In the illustrated embodiment, the camera holding portion 620 includes a camera attachment feature, such as a threaded stud 622, which extends upwardly from a camera mounting clip 624 to engage a camera (not shown). As described above with reference to FIG. 2, the camera mounting clip 624 can be released from the camera mounting portion 620 by depressing an associated release button 628. This enables the camera to be easily engaged and disengaged from the support apparatus 600 during use. The camera holding portion 620 of this embodiment also includes a socket 640 that pivotally receives a first shaped outer portion 612a of a bendable leg 610. The camera holding portion 620 is able to gimbal about the shaped outer portion 612a, until locked in a desired position with a clamping feature 631 (e.g., a rotating lock ring).

From the foregoing, it will be appreciated that specific embodiments of the invention have been described herein for purposes of illustration, but that various modifications may be made without deviating from the spirit and scope of the various embodiments of the invention. For example, while various embodiments of the present invention have been described above in the context of a camera support, those of ordinary skill in the art will appreciate that various features of the present invention are equally well suited for use in supporting and positioning other types of equipment, such as sound equipment, video display equipment, lighting equipment, etc. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

I claim:

1. An apparatus for supporting a camera, the apparatus comprising:
   an adjustable camera holding portion having a camera engagement feature configured to releasably engage a camera; and
   a plurality of formable legs, wherein each of the formable legs includes:
      a first end portion operably coupled to the camera holding portion and a second end portion spaced apart from the first end portion to define a space therebetween;
      an elongate bendable member extending continuously between the first and second end portions; and
      a plurality of spherical portions consecutively arranged on the elongate bendable member in the space between the first and second end portions, wherein the elongate bendable member extends through the center of each of the spherical portions.

2. The apparatus of claim 1 wherein the elongate bendable member includes a material that retains its shape after forming with little or no spring-back.

3. The apparatus of claim 1 wherein each of the spherical portions includes a resilient material.

4. The apparatus of claim 1 wherein the elongate bendable member includes a plastically deformable material, and wherein each of the spherical portions includes an elastomeric material.

5. The apparatus of claim 1 wherein the plurality of spherical portions include at least first and second spherical portions, wherein the first spherical portion has a first convex surface and the second spherical portion has a second convex surface, and wherein the first convex surface contacts the second convex surface.

6. The apparatus of claim 1 wherein the plurality of spherical portions include at least first, second, and third spherical portions, wherein the second spherical portion contacts the first and third spherical portions, and wherein the second spherical portion is angularly movable relative to the first and third spherical portions.

7. The apparatus of claim 1 wherein the plurality of spherical portions include a first spherical portion that is pivotally coupled to the camera holding portion.

8. A portable apparatus for supporting a piece of equipment, the apparatus comprising:
   an equipment holding portion; and
   plurality of bendable support members, wherein each of the bendable support members includes a proximal end portion operably coupled to the equipment holding portion and a distal end portion extending away from the equipment holding portion, and wherein each of the bendable support members further includes a plurality of shaped outer portions forming an exterior surface of the corresponding bendable support member, and wherein each of the shaped outer portions is arranged on an elongate, bendable core extending through each of the corresponding shaped outer portions.

9. The apparatus of claim 8 wherein the plurality of shaped outer portions are contiguously arranged on the bendable core, and wherein each of the shaped outer portions defines a geometric shape.

10. The apparatus of claim 8 wherein the plurality of shaped outer portions are contiguously arranged on the bendable core, and wherein each of the shaped outer portions defines at least a portion of a sphere.

11. A portable apparatus for supporting a piece of equipment, the apparatus comprising:
    an equipment holding portion; and
    plurality of bendable support members, wherein each of the bendable support members includes a proximal end portion operably coupled to the equipment holding portion and a distal end portion extending away from the equipment holding portion, and wherein each of the bendable support members further includes a plurality of shaped outer portions arranged on an elongate, bendable core, wherein the cross-sectional thickness of each of the shaped outer portions varies in the direction of the bendable core.

12. A portable apparatus for supporting a piece of equipment, the apparatus comprising:
    an equipment holding portion; and
    plurality of bendable support members, wherein each of the bendable support members includes a proximal end portion operably coupled to the equipment holding portion and a distal end portion extending away from the equipment holding portion, and wherein each of the bendable support members further includes a plurality of shaped outer portions arranged on an elongate, bendable core, wherein each of the shaped outer portions is an individual piece of material.

13. The apparatus of claim 8 wherein the equipment holding portion includes a camera holding portion.

14. The apparatus of claim 8 wherein the equipment holding portion includes and adjustable camera mounting head having an engagement feature configured to releasably engage a camera.

15. The apparatus of claim 8 wherein the shaped outer portions include at least first and second shaped outer portions, wherein the first shaped outer portion includes a first outer surface and the second shaped outer portion includes a second outer surface, and wherein the first outer surface contacts the second outer surface.

16. An apparatus for supporting a camera, the apparatus comprising:
    a camera holding portion;
    at least one bendable support member, wherein the bendable support member includes a proximal end portion operably coupled to the camera holding portion and a distal end portion extending away from the camera holding portion, and wherein the bendable support member further includes a plurality of shaped outer portions arranged on an elongate, bendable core; and
    a base portion operably coupled to the distal end portion of the bendable support member, wherein the base portion includes attachment means for releasably securing the apparatus to a flat surface.

17. The apparatus of claim 16 wherein the attachment means include a suction cup configured to releasably secure the apparatus to a generally smooth surface.

18. The apparatus of claim 16 wherein the plurality of shaped outer portions include at least first and second shaped outer portions, wherein the first shaped outer portion has a first convex surface and the second shaped outer portion has a second convex surface, and wherein the first convex surface contacts the second convex surface.

19. The apparatus of claim 16 wherein the elongate, bendable core includes a plastically deformable metal.

20. The apparatus of claim 1:
  wherein the elongate bendable member includes a plastically deformable material;
  wherein each of the shaped outer portions is an individual shaped outer portion having a cross-sectional thickness that varies in the direction of the elongate bendable member; and
  wherein each of the shaped outer portions includes an opening extending through the central portion thereof, and wherein the elongate bendable member contacts an interior surface of each of the openings.

* * * * *